United States Patent [19]
Bartlett

[11] Patent Number: 4,755,881
[45] Date of Patent: Jul. 5, 1988

[54] TRANSPORTABLE VIDEO APPARATUS

[75] Inventor: Harrison K. Bartlett, Chula Vista, Calif.

[73] Assignee: Eastman Kodak Company, Rochester, N.Y.

[21] Appl. No.: 947,326

[22] Filed: Dec. 29, 1986

[51] Int. Cl.$^4$ .............................................. H04N 5/64
[52] U.S. Cl. ................................... 358/254; 358/252; 358/93; 312/114
[58] Field of Search ............... 358/229, 254, 255, 252, 358/237, 93; 312/114, 138 R

[56] References Cited

U.S. PATENT DOCUMENTS

| | | | |
|---|---|---|---|
| D. 217,396 | 4/1970 | Gentile | 358/185 |
| 2,299,393 | 10/1942 | Johnson | 358/255 |
| 2,482,031 | 9/1949 | Rose | 358/255 |
| 4,440,057 | 4/1984 | Fogelman | 358/254 |
| 4,719,513 | 1/1988 | Peterson | 358/254 |

FOREIGN PATENT DOCUMENTS

| | | | |
|---|---|---|---|
| 3228700 | 2/1984 | Fed. Rep. of Germany | 358/254 |
| 501532 | 2/1939 | United Kingdom | 358/254 |

OTHER PUBLICATIONS

Spin Physics (Kodak) Brochure, "Motion Analysis Moves Into the 80's", (1984).

Primary Examiner—Tommy P. Chin
Attorney, Agent, or Firm—William F. Noval

[57] ABSTRACT

A transportable video apparatus which is usable outdoors. The apparatus includes a cart which protects the components of the video system from environmental effects, such as rain, snow or the like and allows viewing of a video monitor in bright sunlight without a substantial loss of brightness of the viewed image. The cart houses a video monitor with a face which is substantially horizontal. An upper member includes an opening for viewing the video monitor at an acute angle to the monitor face. A hood pivotally mounted on the top of the cart is movable between a closed position when the apparatus is not in use and an open position for viewing the monitor. The hood has a front edge which prevents incident light from outside of the cart to be reflected back to the viewer from the monitor face, thus eliminating washout of the video image.

4 Claims, 2 Drawing Sheets

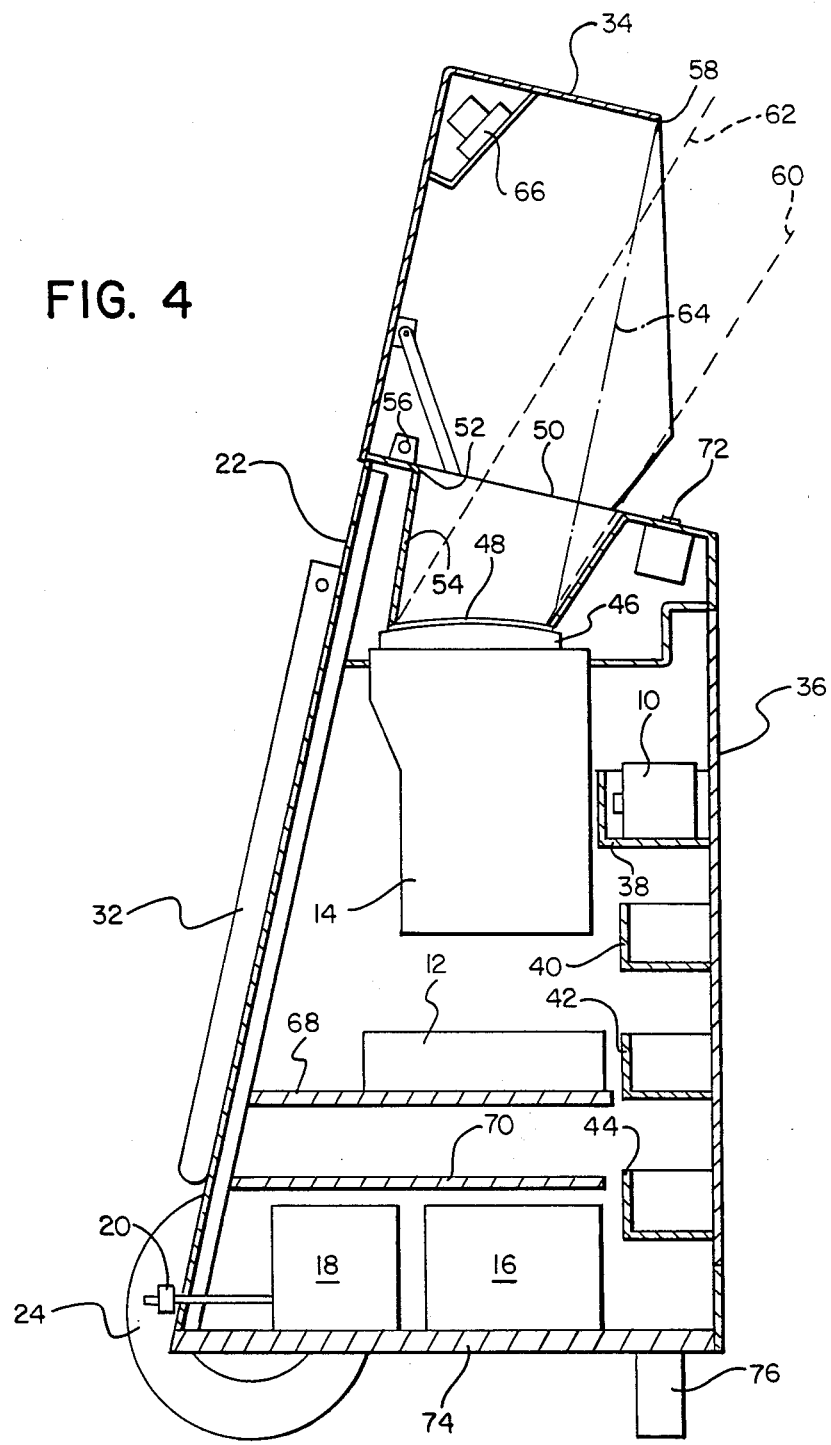

TRANSPORTABLE VIDEO APPARATUS

BACKGROUND OF THE INVENTION

This invention relates to a transportable video apparatus which is usable outdoors, which provides protection to video components from theft and from environmental effects such as rain or snow and which allows viewing of a video image in bright sunlight without substantial loss of image brightness.

The need often arises for recording high speed or rapidly changing scenes so that the scene may be played back in slow or stopped motion in order to analyze the scene. Such motion analysis capabilities are for example, desirable in analyzing the motions of an athlete while engaged in an athletic event such as football, baseball, golfing or the like. Thus it may be desirable to capture the motion of a swinging golf club in order to correct a defect in the golfer's swing. Stop action may be used in football games in order to analyze the correctness of a referee's call on a play or to analyze the movements of a football player, such as those of a quarterback throwing a football to a receiver. Motion analysis systems are also useful in determining the overall athletic prowess of an athlete by determining how fast the athlete can run a 40-yard dash, for example. Other applications in which motion analysis is useful include the operation and fault analysis of machinery, crash testing of transportation systems, aerospace hardware testing and the like.

In such applications, it is desirable that the components of the motion analysis video system be stored in a transportable unit which provides environmental protection and resistance to theft of various expensive video components, while providing easy transportation of the video system to the sight of the event which is to be analyzed. It is desirable that the recorded event be played back at the sight without loss of image brightness caused by sunlight and environmental glare. It is also desirable that a portable motion analysis system be totally self-contained and provide easy accessibility to both the components of the analysis system and the controls therefor. It is also desirable that the motion analysis system be cost effective, simple in operation, rugged for use in adverse terrain, and include a self-contained power source.

SUMMARY OF THE INVENTION

According to the present invention, there is provided a transportable video apparatus which is easily transportable, which is simple in operation, and cost effective, and which may be used outdoors in rugged terrain and adverse environmental conditions. According to an aspect of the invention, a weather-resistant cart is provided for housing the components of the video apparatus. The cart houses a video monitor which is viewable in bright sunlight without loss of image brightness. The monitor includes a video tube having a face which is substantially horizontal. An upper member on the top of the cart has a port for viewing the tube face. According to an aspect of the invention, a hood is pivotally mounted on the top of the cart. The hood is movable between a closed position covering the upper member and an open position in which the front edge of the hood prevents external light from being reflected back to a viewer, thus increasing substantially the brightness of an image on the video monitor.

BRIEF DESCRIPTION OF THE DRAWINGS

In the following description of the drawings, like elements are numbered with like numbers.

FIG. 4 is a partially sectional, side elevational view of the embodiment of FIGS. 1 and 2.

DESCRIPTION OF THE PREFERRED EMBODIMENT

Referring now to the Figures, there is shown a preferred embodiment of the present invention. The present invention relates to a transportable video apparatus. The apparatus is usable outdoors and includes a portable cart for housing the components oF a motion analysis video system. The cart is weather resistant to protect them from environmental effects such as wind, rain and snow and from theft. The cart houses a video monitor which is viewable in bright sunlight during operation of the motion analysis system without substantial loss of the viewed image brightness.

Figure 5:
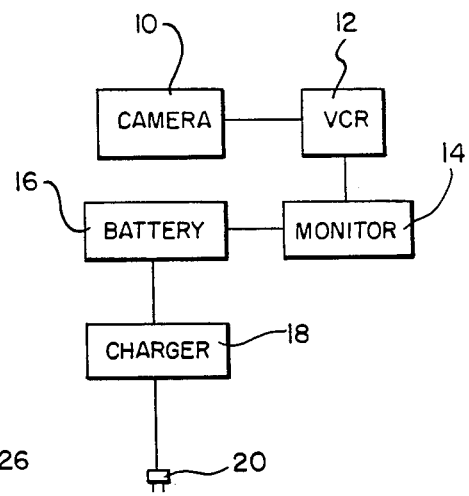
FIG. 5 is a block diagram of a video system incorporating the present invention.

Referring now to FIG. 5, there is shown a block diagram of a motion analysis system incorporating features of the present invention. As shown, a motion analysis video system includes a high speed camera 10 (such as the camera described in commonly assigned, copending U.S. patent application Ser. No. 930,200, now U.S. Pat. No. 4,695,888, entitled "A VARIABLE SPEED CAMERA", by Dean Peterson) which is capable of stopping action by using a variable speed shutter with speeds up to 1/1000 sec. or more. The video signal produced by camera 10 is supplied to a video cassette recorder (VCR) 12, and to a video monitor 14. A battery 16 provides power to video monitor 14 (and also to camera 10 and VCR 12 if desired). Battery 16 is connected to charger 18 which is connectable to an outside power source through plug. 20.

Figure 1:
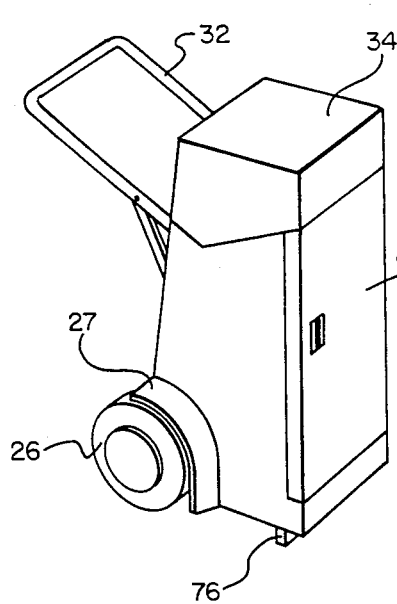
FIGS. 1 and 2 are perspective views of a preferred embodiment of the present invention.
Figure 2:
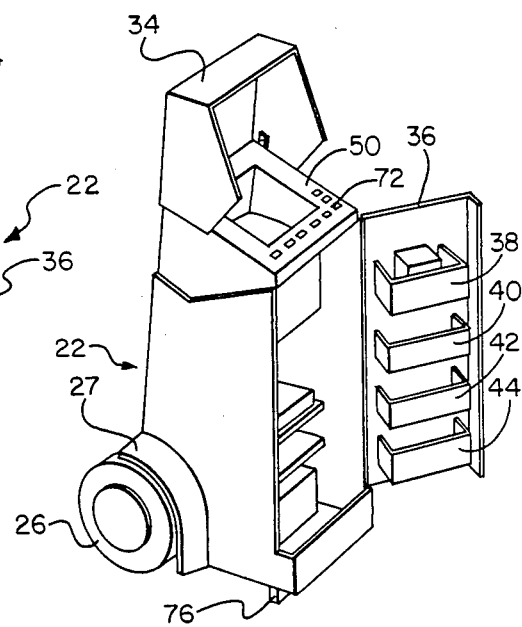
Figure 3:
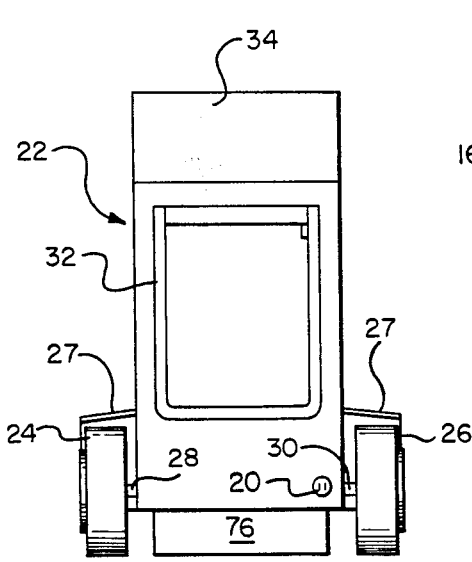
FIG. 3 is a rear elevational view of the embodiment of FIGS. 1 and 2.

According to the present invention, the components of the motion analysis system described in FIG. 5 are housed in a weather proof cart which is transportable and which protects the components of the system from theft, rain and snow, etc. A preferred embodiment of such a transportable cart is shown in more detail in FIGS. 1–4. As shown, a substantially vertically oriented cart 22 of weather resistant meterial is transportable by means of wheels 24 and 26 mounted on the lower portion of cart 22 by respective shafts 28 and 30. Fenders 27 shield wheels 24, 26. A collapsible handle 32 is pivotally mounted on the rear of cart 22 for easy transportation of cart 22. Cart 22 includes a hood 34 mounted on the top and a door 36 at the front. Hood 34 and door 36 are respectively movable between closed positions (FIG. 1) and open positions (FIG. 2). Door 36 has a plurality of shelves 38, 40, 42, 44 for holding components of the video system (such as camera 10 on shelf 38).

Video monitor 14 is mounted in a vertical position in the upper portion of cart 22 and has a tube 46 with a face 48 which is disposed generally horizontally. An upper member 50 mounted on the top of cart 22 includes a port 52 through which the monitor may be viewed. Face 48 is positioned a distance below port 52 and communicates therewith through viewing tunnel 54.

The video monitor will be viewed outdoors where bright sunlight and other external reflections on the monitor face may so severely degrade the brightness of the image as to render it unviewable. According to a feature of the present invention, hood 34 is pivotally mounted on the top of cart 22 by pivots 56 (FIG. 4). In the closed position, hood 34 covers member 50. In the open position, a front edge 58 of hood 34 is so oriented with respect to the face 48 of monitor 14, that it allows viewing at an acute angle to face 48 (dashed lines 60, 62) but blocks reflection to the viewer of glare or sunlight incident on face 48 (chain line 64). Thus the video image produced by monitor 14 is viewable at substantially full image brightness, free of external glare and reflections.

A speaker 66 is mounted on the inside of hood 34 and is connected to monitor 14 (VCR 12).

Cart 22 is provided with shelves 68 and 70 for supporting components of the video system (such as VCR 12 on shelf 68). A replaceable control module 72 is supported on member 50. Module 72 may control camera 10 and VCR 12 for example when they are used to record an event. Battery 16 and charger 18 are mounted on the bottom member 74 of cart 22. A foot 76 is also provided on the bottom of member 74.

The invention has been described in detail with particular reference to preferred embodiments thereof, but it will be understood that variations and modifications can be effected within the spirit and scope of the invention.

What is claimed is:

1. A transportable video apparatus comprising:
   a substantially vertical weatherproof cart;
   wheel means mounted on the lower portion of said cart for transporting said cart;
   a video monitor housed within the upper portion of said cart, said video monitor including a video tube having a face which is substantially horizontal;
   an upper member on the top of said cart having a port for viewing said monitor;
   a hood mounted on the top of said cart and movable between a closed position in which said hood covers said upper member and an open position in which the front edge of said hood is so oriented with respect to said face of said video tube that is allows direct viewing only thereof at an acute angle with respect to said face, but that it blocks reflection to a viewer of external light falling on said face through said acute angle so that the brightness of an image on said video tube is not substantially diminished by bright sunlight or external glare; and
   a speaker mounted on the inside of said hood and electrically connected to said monitor.

2. The apparatus of claim 1 wherein said monitor is positioned below said upper member and including a viewing tunnel disposed between said face of said video tube and said viewing port of said upper member.

3. The apparatus of claim 1 wherein said cart houses a battery for supplying power to said video monitor so that said monitor may be operated at locations where an external power source is not available.

4. The apparatus of claim 1 wherein said cart includes means for housing (1) a video cassette recorder (VCR) which is connected to said video monitor and (2) a video camera for capturing events to be recorded by said VCR and to be played back on said video monitor.

* * * * *